United States Patent Office 3,294,934
Patented Dec. 27, 1966

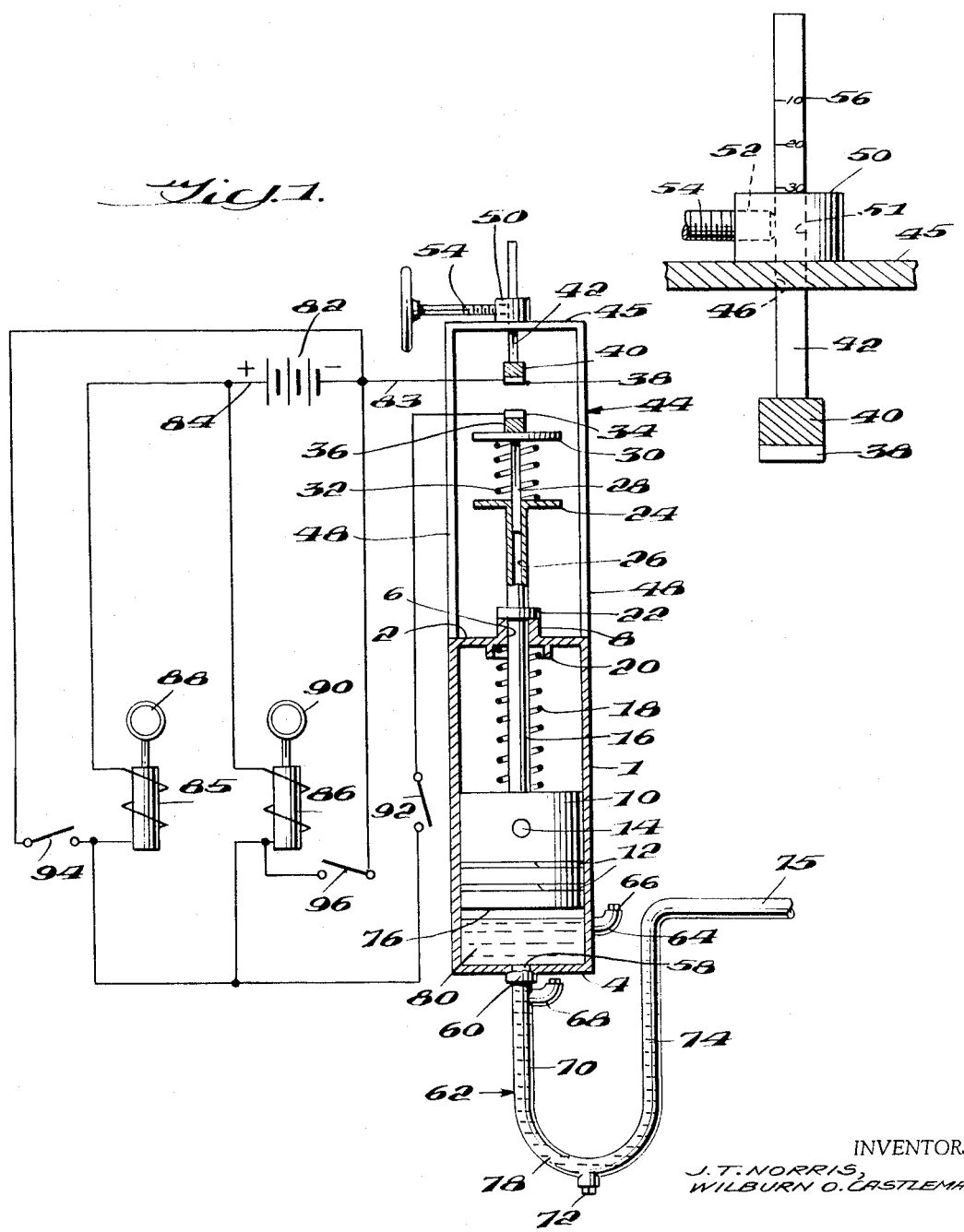

3,294,934
PRESSURE RESPONSIVE DEVICES
J. T. Norris and Wilburn O. Castleman, both of Waynesboro, Tenn.
Filed Jan. 21, 1964, Ser. No. 339,306
3 Claims. (Cl. 200—82)

This invention relates to pressure responsive devices and methods of actuating the same, and more particularly to pressure responsive safety controls for steam boilers or the like.

Pressure responsive controls of various types are available for interrupting the water or heat supply to a boiler or the like in the event of undesirably high pressure in the system. However, such safety devices are not always satisfactory because they are too complicated and expensive; they are prone to malfunction caused by a corrosive environment; they are easily damaged; they are difficult to calibrate; or they do not operate to interrupt both the water and the heat supply to a boiler or the like.

It is an object of this invention to provide a pressure responsive device which is uncomplicated and trustworthy.

It is another object of this invention to provide a pressure responsive device and a method of actuating the same in a corrosive fluid environment wherein corrosive action on the elements of the device is minimized.

It is a further object of this invention to provide a pressure responsive device including cooperating electrical contacts which are insulated against damage caused by the shock of pressure actuation.

It is also an object of this invention to provide a pressure responsive control device that lends itself to convenient calibration and setting to meet the requirements of the prevailing pressure in the system in which it is to be utilized.

It is still another object of this invention to provide a pressure responsive control device which operates to interrupt both the heat and the water supply to a boiler or the like upon the advent of undesirably high pressure in the system.

In achieving these and other objects which will appear hereinafter, the present pressure responsive apparatus includes a cylinder having piston means reciprocally mounted therein and urged toward one end thereof, said piston means having a fluid lubricant contacting surface facing said one end of said cylinder, a gas conduit, one end of which is unimpededly connected to the interior of said cylinder adjacent said one end thereof, another end of said conduit adapted to be connected to a source of pressurized fluid to which the device is responsive, said cylinder being adapted to receive fluid lubricant in said cylinder between said fluid contacting surface and said conduit, and movement responsive means operatively associated with said piston means and adapted to be actuated by movement of said piston means within said cylinder in accordance with fluid pressure variation.

The present method of actuating a pressure responsive device having a cylinder and a piston reciprocally mounted therein comprises interposing a volume of fluid lubricant between the piston and a pressurized corrosive fluid, and permitting said corrosive fluid to make contact with and tend to compress said fluid lubricant thereby moving the piston in accordance with the pressure of the corrosive fluid and actuating the device. In this manner, the piston is maintained in a lubricated condition and insulated against the corrosive effects of the pressurized corrosive fluid.

To safeguard the movement responsive means against damage occasioned by excessive movement of the piston means, a shock absorbing, resiliently compressible supporting means may be interposed between the piston means and the responsive means.

For convenient calibration of the pressure responsive device to meet the pressure requirement of the system with which the device is to be utilized, the movement responsive means may include a pair of electrical contacts, at least one of the contacts being supported by slidably and adjustably mounted slide means having indicia thereon.

This preferred embodiment of the invention is illustrated in the accompanying drawings, in which:

FIGURE 1 is a schematic, vertical, cross-sectional view of the instant pressure responsive safety control including an electrical circuit diagram of a preferred form of circuitry for controlling a boiler or the like; and FIGURE 2 is an enlarged schematic, front elevational view of the calibration apparatus of this invention, as shown in FIGURE 1.

Referring in more detail to FIGURE 1 of the drawings, the illustrated embodiment of this pressure responsive device includes a vertically extending circular cylinder 1 having its upper and lower ends closed by an upper plate 2 and a lower plate 4. The upper plate 2 is provided with a central aperture 6 having a raised shoulder portion 8 thereabout. Reciprocally mounted within the cylinder 1 is a piston 10 having piston rings 12 abutting the circular walls of the cylinder 1. A cylinder sleeve (not shown) may be provided as a replaceable wear surface. Pivotally connected to the upper end of the piston 10 by a wrist pin 14 or the like is a circular piston rod 16 slidably received in the central aperture 6 of the upper cylinder plate 2. Coaxially mounted about the piston rod 16, between the upper cylinder plate 2 and the piston 10 is a coil spring 18 which may be retained about the piston rod by a retaining collar 20. The spring 18 acts to urge the piston in a downwardly direction towards the bottom of the cylinder 1. However, the extent of such movement is limited by a rod limiting collar 22 fixedly attached to the piston rod 16. Abutment of the limiting collar 22 against the upper plate shoulder portion 8 prevents the piston 10 from bottoming in the cylinder 1.

The piston rod 16 is further provided with a rod disk 24 surrounding a longitudinally extending bore 26. Slidably mounted in the rod bore 26 is a contact slide 28 the upper end of which is fixedly connected to a slide disk 30. A coil spring 32 is coaxially positioned about the contact slide 28 between and fixedly connected to the slide disk 30 and the rod disk 24 so as to resiliently and compressibly retain the slide 28 in the rod bore 26. A first electrical contact 34 is fixedly connected to the slide disk 30 with an insulator 36 interposed therebetween.

Positioned in vertically spaced relationship to the first electrical contact 34 is a second electrical contact 38. Both contacts 34 and 38 have lead wires connecting the contacts to a control circuit which will be discussed subsequently. An insulator 40 fixably connects the second contact 38 with a second contact slide 42 adjustably and slidably supported in a supporting frame 44. The frame 44 comprises an upper plate 45 having a central aperture 46 therein supported in spaced relation to the upper cylinder plate 2 by a plurality of vertically extending rods 48. The supporting frame 44 is further provided with a supporting collar 50 fixedly connected to the upper plate 45 about the periphery of the aperture 46. The collar 50 also includes a vertically extending bore 51 to slidably receive the contact slide 42. A horizontally extending, threaded bore 52 is provided in the collar 50 and a threaded set screw 54 is received therein for adjustable abutment against the slide 42 to adjustably fix the same at a desired elevation relative to the frame 44.

As shown in FIGURE 2, the upper end of the slide 42 is provided with a plurality of vertically spaced graduations 56. To calibrate or subsequently reset the instant pressure responsive device, it is merely necessary to loosen the set screw 54 and slide the contact 38 to the desired elevation as will be indicated by the graduations 56.

The lower plate 4 of the cylinder 1 is provided with a threaded central aperture 58 to threadedly receive a coupling 60 threadedly connecting a U-shaped conduit 62 to the interior of the cylinder 1. Positioned above the bottom of the cylinder 1 is an elbow 64 having a bore therein in fluid connection with the interior of the cylinder 1, the upper end of the bore being threaded to receive a threaded plug 66. A similar elbow 68 is provided in the upper end of a first leg 70 of the U-shaped conduit 62, and a drain 72 is positioned at the lowest point of the U-shaped conduit. A second leg 74 of the U-shaped conduit 62 extends in an upwardly direction at least to the elevation of a fluid contact surface 76 at the lower end of the piston 10 after which the conduit may be directed, as at 75, in any desired manner to a source of pressurized fluid to the pressure of which the device is responsive.

For actuating the instant pressure responsive device in accordance with the subject method, both legs 70, 74 of the U-shaped conduit 62 are filled with water 78 through and up to the level of the elbow 68. Subsequently the lower end of the cylinder 1 is filled with a liquid lubricant 80 such as 50-weight motor oil or the like, through and up to the level of the elbow 64. The weight of the lubricant bears downwardly on the column of water in the first leg 70 of the U-shaped conduit 62 thereby causing the level of the water in the second leg 74 of the U-shaped conduit to rise approximately to the level of the surface of the fluid lubricant, i.e. the level of the elbow 64. Because oil is lighter than the water, the relative orientation will not be disturbed. Pressurized fluid in the conduit 75 will act upon the uppermost surface of the water in the leg 74 so as to press the water downwardly in the leg 74. Consequently, the fluid lubricant 80 and the piston 10 in the cylinder 1 will be moved upwardly, the extent of such upward movement depending upon the magnitude of the pressure of the pressurized fluid in the conduit 75.

As pressure in the conduit 75 increases, more water is lifted into the bottom of the cylinder 1, lifting the volume of oil 80 therein so as to lift the piston 10. The piston 10 carries the first contact 34 upwardly until it abuts the second contact 38. After initial abutment of the contacts, further upward movement of the piston merely compresses the coil spring 32 and telescopes the slide 28 within the rod bore 26. It will be seen that the spring 32 provides an initial shock absorbing action. However, this lost motion connection is considered to be of further significance. In this regard, it is known that in some systems, system pressure may continue to increase for a short period of time after actuation of a pressure responsive cut-off control. In the instant device, such further increase in pressure could operate to damage the contacts 34, 38 by further upward movement of the piston 10. However, by the provision of a lost motion connection between the contacts and the piston, the possibility of damage to the contacts is circumvented.

In utilizing the subject method and apparatus as a safety control for a steam boiler (not shown), a control circuit is provided that will interrupt both the water and the heat supply to the boiler. A voltage source 82 such as a battery, or the like, is provided, the negative lead 83 from which is connected to the contact 38. A positive lead 84 is connected to first and second solenoids 85 and 86, respectively, in parallel. Energizing the solenoid 85 by the closing of contacts 34 and 38 operates to interrupt the supply of water to the boiler as by turning a water valve 88 or by interrupting power to a water pump. Similarly, energizing solenoid 86 operates to cut off the fuel supply valve 90 or the like to the steam boiler heating unit. A normally closed switch 92 is provided to eliminate the effect of the pressure sensitive safety control from the system. Switches 94, 96 are provided to make possible interrupting the water and heat supply to the boiler without actuation of the pressure responsive control. It is anticipated that a warning signal (not shown) operable on closing of the contacts 34, 38 may be included.

Although in the illustrated embodiment a piston rod limiting collar 22 is provided to prevent the piston 10 from bottoming in the cylinder 1, it will be appreciated that this collar may be eliminated and the piston permitted to so bottom. However, in such an arrangement, the length of the vertically extending leg 74 should be extended upwardly an appreciable distance from the position shown in FIGURE 1.

Further, although it is preferred that the U-shaped conduit 62 be filled with water as an economy measure, this invention obviously includes within its scope filling both the bottom of the cylinder 1 and the conduit 62 with fluid lubricant, such as motor oil. In such an arrangement, the pressurized fluid acts directly on the oil.

It will also be appreciated that while the device is shown to be so oriented that the piston is urged in a downwardly direction by the spring 18, this spring may be eliminated and reliance placed upon gravity to so urge the piston in a downwardly direction.

It should also be noted that the overall pressure responsive device may be used in an inverted position wherein a spring 18 acts to urge the piston in an upwardly direction. In such an embodiment (not shown) the U-shaped conduit 62 may be eliminated and the conduit 75 may be directly connected to the cylinder 1 at the aperture 58. In this manner, pressurized fluid is permitted to act directly upon the lubricant 80 to drive the piston 10 in a downward direction so as to facilitate closing a circuit between the contacts 34 and 38. As an alternative of this arrangement, water may be provided in the conduit 75 and a fluid lubricant of a specific gravity greater than the water utilized.

Although the subject apparatus and method is disclosed as a safety device for steam boilers, it is equally adaptable to pressure regulation of air compressors, hot water heaters, high pressure pumping systems, and to actuate pressure gauges in general.

It will be appreciated that by the provision of a pressure responsive safety control adapted to interrupt both the water and heat supply to a steam boiler, a safer condition is insured. If either the water or the fuel supply alone is interrupted a dangerous or wasteful condition results. For example, if only the water supply is interrupted, the continuous heat supply may quickly cause a boiler flue, not covered by water, to overheat. If water is subsequently introduced into the boiler, the initial water-flue contact generates a great amount of live steam. This generation is so rapid that pop-off valves or similar devices cannot effectively control the pressure. By automatically interrupting both water and heat to the boiler, such a problem is eliminated and fuel and water economy is enhanced.

Further, by the provision of a cushioning volume of oil between the steam or other corrosive gases and the piston, the corrosive action on the piston and cylinder may be minimized, proper piston cylinder lubrication is insured, and the reciprocating piston pressure responsive device is insulated against the possibility of sticking which is frequently induced by the corrosive action of the gas.

Still further, the provision of a shock absorber and lost motion connection between the contact 34 and the piston rod 26, safeguards both contacts from damage from momentary shocks or further upward movement of the piston 10 after initial abutment of the contacts.

Finally, since the upper contact 38 is conveniently slidably adjustable with clearly viewable indicia on its slide, the pressure responsive device may be easily calibrated upon installation and also permits ease in subsequent adjustment.

Although a single embodiment of the invention has been illustrated and described in detail, along with several modifications, various other modifications and alterations

We claim:

1. A pressure responsive device comprising a cylinder having a surrounding wall, a piston movably mounted in the cylinder, a liquid level device having a column of corrosive liquid exposed at one side to a pressure fluid and at the opposite side to the piston, a body of lubricant intermediate said column of liquid corrosive fluid and the piston for transmitting pressure to the piston and moving the latter in response to variations in pressure of the fluid, a piston rod connected with the piston and extending outwardly therefrom, means yieldably urging the piston toward one end, a bearing member mounted on the piston rod for movement axially relative thereto, means yieldably urging said member in one direction relative to the piston rod, and control means operatively connected with the bearing member.

2. A pressure responsive device according to claim 1, wherein the control means includes an electrical contact carried by the bearing member, and a second contact in position for engagement by the first contact upon movement of the piston.

3. A pressure responsive device according to claim 2, including slidably adjustable means having indicia thereon for adjustably supporting the second contact.

References Cited by the Examiner

UNITED STATES PATENTS

| | | | |
|---|---|---|---|
| 271,560 | 1/1883 | Willson | 200—82.3 |
| 406,981 | 7/1889 | Amory et al. | |
| 755,708 | 3/1904 | Schmitz | 200—82 |
| 778,784 | 12/1904 | Holmok | 200—82 |
| 831,226 | 9/1906 | Hinkson | 200—82 |
| 1,961,395 | 6/1934 | Schlobohm | 122—448 |
| 2,257,816 | 10/1941 | Russel | 200—82 |
| 2,661,409 | 12/1953 | Lorenzetti | 200—82 X |

FOREIGN PATENTS 499,267   11/1950   Belgium.

KENNETH W. SPRAGUE, *Primary Examiner.*